US008581547B2

(12) United States Patent
Hoff

(10) Patent No.: US 8,581,547 B2
(45) Date of Patent: Nov. 12, 2013

(54) METHOD FOR DETECTING CELL STATE-OF-CHARGE AND STATE-OF-DISCHARGE DIVERGENCE OF A SERIES STRING OF BATTERIES OR CAPACITORS

(75) Inventor: C. Michael Hoff, Boxborough, MA (US)

(73) Assignee: A123 Systems LLC, Livonia, MI (US)

( * ) Notice: Subject to any disclaimer, the term of this patent is extended or adjusted under 35 U.S.C. 154(b) by 1035 days.

(21) Appl. No.: 12/416,072

(22) Filed: Mar. 31, 2009

(65) Prior Publication Data
US 2009/0243548 A1  Oct. 1, 2009

Related U.S. Application Data

(60) Provisional application No. 61/040,926, filed on Mar. 31, 2008.

(51) Int. Cl.
*H02J 7/00* (2006.01)
*H02J 7/04* (2006.01)

(52) U.S. Cl.
USPC ........... 320/116; 320/118; 320/128; 320/132; 320/134; 320/148

(58) Field of Classification Search
CPC ...................................................... Y02E 60/12
USPC ...................................................... 320/116
See application file for complete search history.

(56) References Cited

U.S. PATENT DOCUMENTS

| 5,198,743 | A  | * | 3/1993  | McClure et al. | ............... 320/145 |
|-----------|-----|---|---------|----------------|---------|
| 6,366,054 | B1  |   | 4/2002  | Hoenig et al.  |         |
| 6,456,042 | B1  |   | 9/2002  | Kwok           |         |
| 7,737,659 | B2  | * | 6/2010  | Morioka        | ........................ 320/128 |
| 7,990,108 | B2  | * | 8/2011  | Aas et al.     | ........................ 320/134 |
| 2002/0195999 | A1 | * | 12/2002 | Kimura et al.  | ................. 320/134 |
| 2006/0093894 | A1 | * | 5/2006  | Scott et al.   | ..................... 429/50 |
| 2006/0208701 | A1 |   | 9/2006  | Mikhaylik      |         |

FOREIGN PATENT DOCUMENTS

| EP | 01396063 A2 | 3/2004 |
|----|-------------|--------|
| WO | WO-02095897 A2 | 11/2002 |
| WO | WO-2007/111988 A2 | 10/2007 |

OTHER PUBLICATIONS

International Search Report issued for PCT/US2009/039040, dated Nov. 10, 2009 (3 pages).

* cited by examiner

*Primary Examiner* — Edward Tso
*Assistant Examiner* — Ahmed Omar
(74) *Attorney, Agent, or Firm* — Wilmer Cutler Pickering Hale and Dorr LLP

(57) ABSTRACT

A system for charging a battery includes a battery pack having at least two lithium ion cells. A controller detects a rate of change of voltage with respect to a state of charge (dV/dSOC) of the battery pack based on a calculated dV/dSOC that represents the battery pack as a whole, without calculating dV/dSOC individually on a cell-by-cell basis. Charging is terminated when dV/dSOC reaches a predetermined value.

23 Claims, 8 Drawing Sheets

METHOD FOR DETECTING CELL STATE-OF-CHARGE AND STATE-OF-DISCHARGE DIVERGENCE OF A SERIES STRING OF BATTERIES OR CAPACITORS

RELATED APPLICATIONS

This application claims priority to U.S. Provisional Application No. 61/040,926 filed Mar. 31, 2008.

FIELD OF THE INVENTION

Embodiments consistent with the present invention relate to apparatuses and methods for detecting divergence in the state-of-charge (SOC) or state-of-discharge (SOD) of a series string or "pack" of battery cells or capacitor cells, and more specifically, to apparatuses and methods for detecting divergence in SOC and SOD in a string of lithium ion battery cells.

BACKGROUND OF INVENTION

Contemporary portable electronic appliances rely almost exclusively on rechargeable Li-ion batteries as the source of power. This has spurred a continuing effort to increase their energy storage capability, power capabilities, cycle life and safety characteristics, and decrease their cost. A lithium-ion battery or lithium ion cell refers to a rechargeable battery having an anode capable of storing a substantial amount of lithium at a lithium chemical potential above that of lithium metal.

By way of example, consider a battery pack that is formed from a number of lithium cells connected together in series. The lifetime of the lithium battery pack degrades if the voltage across one of its cells falls below a predetermined threshold during discharge (e.g. 1.5 volts), or rises above a predetermined threshold during charging (e.g., 3.9 volts). For this reason the prior art has traditionally monitored carefully cell voltages and taken measures to maintain cell voltages in a particular range.

To complicate matters further, manufacturing defects in lithium cells result in some cells that do not hold as much charge as other seemingly identical cells. For this reason, when a number of lithium cells are connected together in series, defective cells discharge more quickly than the other cells and more quickly reach the lower threshold described above during discharge. Similarly, such defective cells are often the first to hit the upper threshold during charging. This imbalance between cells limits the effective range of operation of the battery pack, unless the charge is rebalanced during operation.

Inside a lithium ion battery, there are a number of ions which migrate throughout the cell as the cell's state of charge is changed. For example, the ions are stored in a specific location of a lattice structure in a full SOC condition, as is known in the art. As the SOC depletes or the cell discharges energy, the ions within the cell move to a different lattice structure in a different location of the cell. The flow of electrons is caused by a load that enables the movement of ions within the cell. In a series configuration of lithium ion cells, e.g., a battery pack, the migration of ions occurs in each individual cell. If an individual cell within a battery pack were to deplete, i.e., have no more ions to move over to the discharge lattice structure, voltage will build on that cell causing potentially irreparable harm to the cell or battery pack.

Lithium ion cells, as opposed to nickel metal hydride or nickel cadmium cells, are not as naturally balanced. Accordingly, management of SOC of a battery pack including lithium ion cells has traditionally required an accounting for the SOC in each individual cell. Prior art systems include balancing mechanisms to make sure each cell has a similar amount of ions. As an alternative, it has been attempted to meticulously manufacture batteries with identical cells such that each cell reaches an SOC and SOD at the same time. The prior art approaches, however, are disadvantageous as a manufacturer has to incur additional costs to ensure precise quality control and monitoring of each individual cell.

When lithium ion batteries or capacitors or other electrochemical generators such as hybrid or "asymmetric" devices comprising both capacitive and faradic storage are joined in a series string in order to obtain a higher voltage than a single cell can provide, repeated charge and discharge of the string can result in cells getting "out of balance" such that the state-of-charge of cells varies along the string. The out-of-balance condition can arise from differences in the rate of capacity fade upon cycling of the cells, or variations in impedance leading to differences in capacity fade rate, amongst other causes. The string may not be perfectly balanced to begin with, with the cells in the series string varying in their capacity or state-of-charge upon assembly of the string. There are many applications of such packs, including, but not limited to, power tool or appliance batteries, electric vehicle batteries, and batteries for backup power.

An out-of-balance series string such as described here can be undesirable for several reasons. Upon charging of the series string, a cell of lower capacity or higher SOC can be overcharged when the string is charged to a specified pack voltage, resulting in premature failure of the pack or an unsafe condition, such as venting of the cell or thermal runaway or explosion. The same can occur upon discharge of an imbalanced string. In extreme cases, discharge of an out-of-balance pack can send certain cells into "voltage reversal" where the polarity of a cell is opposite to that during normal use. In a lithium ion cell this can result in dissolution of the negative current collector causing failure or gas generation causing mechanical rupture of the cell. The prior art approach to avoiding the problems associated with an imbalanced string is to have individual cell monitoring and balancing, which requires additional control circuitry and increases the cost and complexity of the battery configuration.

SUMMARY OF EXEMPLARY EMBODIMENTS OF THE INVENTION

Non-limiting examples of a pack of battery cells include lithium ion cells utilizing a LiMPO4 positive electrode where M comprises one or more of Fe, Mn, Ni or Co, or a $LiMn_2O_4$ spinel positive electrode, or a $Li4Ti_5O_{12}$ negative electrode, these types of compounds typifying lithium storage materials that exhibit a sharp rise in cell voltage as full SOC is reached or sharp drop in cell voltage as full SOD is reached. Often this is due to the existence of a constant voltage across a wide range of SOC resulting from a two-phase reaction as lithium is inserted or removed.

According to an aspect of the invention, use is made of the characteristic variation in voltage of particular cell chemistries as the limits of charge and discharge are reached in order to detect the existence of one or more out-of-balance cells, and to adjust the charging or discharging protocol on the basis of such input in order to avoid overcharge or over discharge, avoid unsafe conditions, or prolong the life of the pack. According to another aspect, voltage monitoring and control is included in the design of a pack, or in the charger for a pack. A charger can perform charging as well as discharging functions and therefore can serve as a means for diagnosing the condition of the series string of cells in the pack. The number of cells joined in series may be as low as two or as high as ten or twenty or even greater in number, the upper limit of the number of cells being limited by the precision with which the series voltage can be measured compared to the steepness of the response of any single cell.

According to an aspect, a series string of cells is charged at a constant current, and the voltage vs. time response of the string, V(t), or the first time derivative of the voltage, dV/dt, or the second time derivative of the voltage, $d^2V/dt^2$, are used to identify the existence of one or more out of balance cells. In further embodiments, dv/dSOC is used to detect the existence of out of balance cells and end charging.

In some instances, a cell may exhibit multiple voltage steps during charge or discharge. A detection scheme can also be used in such instances despite the occurrence of other steps in voltage partway through charging or discharging of the pack. For example, when the cell chemistry inherently has such steps, the pack voltage will also exhibit characteristic steps in voltage. By applying an additional condition that the absolute pack voltage must be above (below) a certain value on charge (discharge), a current-limiting operation can be applied only when the pack is nearing the top (bottom) of charge.

In an exemplary embodiment, a system for charging a battery is provided that comprises a battery pack having at least two lithium ion cells. A controller is provided that detects a rate of change of voltage with respect to a state of charge (dV/dSOC) of the battery pack based on a calculated value of the dV/dSOC that represents the battery pack as a whole, such that charging is terminated when dV/dSOC reaches a predetermined value.

According to an aspect, the battery pack consists of at least two lithium ion cells connected in series. In one aspect, the battery pack may be one from the group comprising an n series (nS), wherein n is at least two and no more than ten. The at least two lithium ion cells may comprise LiFe1-yMnyPO4, wherein y represents various concentrations of Mn.

The controller may comprise a microprocessor that terminates the charging. In other aspect, the controller comprises analog circuitry.

In a further exemplary aspect, the microprocessor is coupled to lights within the charger, wherein the lights are indicative to a user of a charging status of the battery pack.

In an aspect, the controller is configured to detect temperature of the internal components of the battery pack and will terminate charging if the temperature exceeds a predetermined threshold value. The temperature may be detected by a thermistor.

In an exemplary embodiment, a battery charger is provided that comprises a battery pack comprising lithium ion cells. A circuit is included that determines a rate of change of voltage of the battery pack with respect to a state of charge (dV/dSOC) of the battery pack based on a monitoring of a single dv/dSOC of the battery pack as a whole. Sensing circuitry is provided to terminate charging of the battery pack when a predetermined dV/dSOC has been reached.

In one aspect, the charger comprises a regulated switching power supply capable of accepting an input voltage from an AC or DC power source.

In another aspect, the power supply is controlled by a microprocessor. The microprocessor may terminate charging based on readings of the voltage and current of the battery pack.

In another aspect, temperature sensing circuitry is provided to monitor the temperature of at least one of the battery pack and the charger. In a further aspect, the voltage sensing circuitry comprises at least one of digital or analog converter circuitry. In an even further aspect, the microprocessor is coupled to voltage sensing circuitry to determine the dV/dSOC of at least one lithium ion cell within the pack.

In an aspect, charging of the battery pack is terminated by the microprocessor upon a condition of dV/dSOC of at least one lithium ion cell exceeding a predetermined rate.

In another exemplary aspect, a method is provided to "smooth" a voltage-capacity curve, in those instances where a battery chemistry inherently has steps in voltage, but the capacity at which the voltage step occurs can be varied. Taking as a non-limiting example olivine positive electrodes LiMPO4 or their doped or modified compositions, when M comprises multiple transition metals such as one or more of Fe, Mn, Ni or Co, it is often the case that the charge and discharge curves exhibit distinct steps in voltage. When a particular composition is used in a battery or battery pack, upon discharge, the discharge voltage may undergo a steplike behavior where the voltage drops relatively quickly as the battery or pack passes through a particular state of charge. This can be disadvantageous since the power of the battery decreases correspondingly at that state of charge; for instance, a power tool user may notice a decrease in power during discharge at that pack capacity.

A further exemplary embodiment provides a method of charging a battery pack of at least two or more lithium ion battery cells; and detecting the rate of change of voltage with respect to the state of charge (dV/dSOC) based on a calculation of the dV/dSOC that represents the battery pack as a whole. The method further comprises comparing the detected dV/dSOC with a predetermined dV/dSOC associated with the battery pack; and terminating the charging of the battery pack based on the comparison.

In one aspect, the detecting dV/dSOC is performed without individually detecting dV/dSOC on a cell by cell basis. In another aspect, the terminating the charging of the battery pack occurs if the detected dV/dSOC is equal to or exceeds the predetermined dV/dSOC In a further aspect, the method includes detecting the temperature of the battery pack and terminating the charge based on the temperature reading.

In accordance with an additional aspect, a method for mitigating abrupt voltage steps and obtaining a more continuous discharge voltage is provided. Taking for example compositions LiFe1-yMnyPO4, as the amount of Mn, y, increases, a greater proportion of the cell capacity lies on a higher voltage plateau, ~4.0V, and a smaller proportion lies on a lower voltage plateau, ~3.45V (the voltages being measured with respect to Li/Li+). A single composition y therefore may have a relatively sharp step down in voltage at a capacity that is determined by the value of y. In order to "smooth" the voltage during discharge, powders varying in y are mixed together when fabricating electrodes and cells. Variations in y may be produced in a single fired powder through deliberately introduced "inhomogeneity" such that particles of the positive electrode material vary in y. Or, homogeneous powders each having a single y value may be mixed together and then used in an electrode. For example, powders of y=0.6, 0.5, and 0.4 may be synthesized separately and mixed. Finally, multiple cells each having a different y value may be prepared, and used together in a pack to provide smoother voltage response. The smoothing of voltage response is especially effective during high discharge rates.

BRIEF DESCRIPTION OF THE DRAWINGS

Other aspects of non-limiting embodiments of the present invention will become apparent from the following description taken in conjunction with the accompanying drawings.

DETAILED DESCRIPTION OF EXEMPLARY EMBODIMENTS OF THE INVENTION

Illustrative, non-limiting embodiments of the present invention overcome the disadvantages described above and other disadvantages. Also, the present invention is not required to overcome the disadvantages described above and the other disadvantages, and an illustrative, non-limiting embodiment of the present invention may not overcome any of the disadvantages.

Exemplary embodiments consistent with the present invention provide apparatuses and methods to monitor a SOC and SOD of a lithium ion battery. In an embodiment, separate hardwired connections for each cell in a battery pack are not necessary to monitor individual cell voltages in order to detect SOC and SOD. The battery pack voltage is monitored in such fashion that no individual cell is overcharged, while providing a sufficiently charged battery. Therefore, unlike prior lithium ion battery chargers, the charger does not need to provide separate monitoring hardware for each cell to determine an approaching state of overcharge or over discharge. The charger may terminate charge on the basis that at least one cell in the battery pack has reached that threshold based on monitoring dV/dt or dV/dSOC for the entire battery pack. For example, one dV/dt or dV/dSOC is monitored representing the entire battery pack to provide a rate of change for the battery pack as a whole.

Figure 1A:
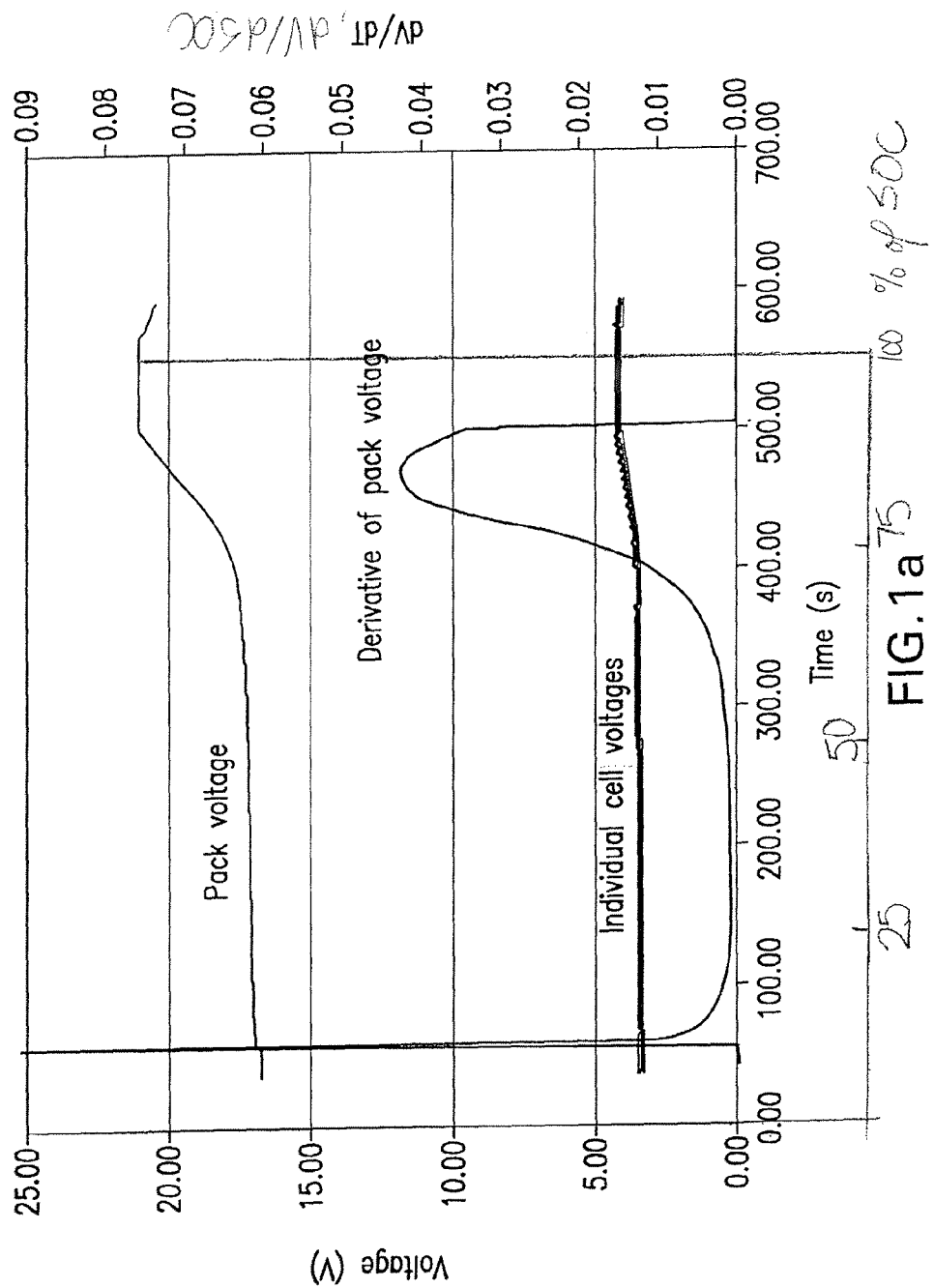
FIG. 1(a) is a graph demonstrating a balanced battery pack charged from ~85% SOC to full SOC, in accordance with an exemplary aspect of the invention.
Figure 1B:
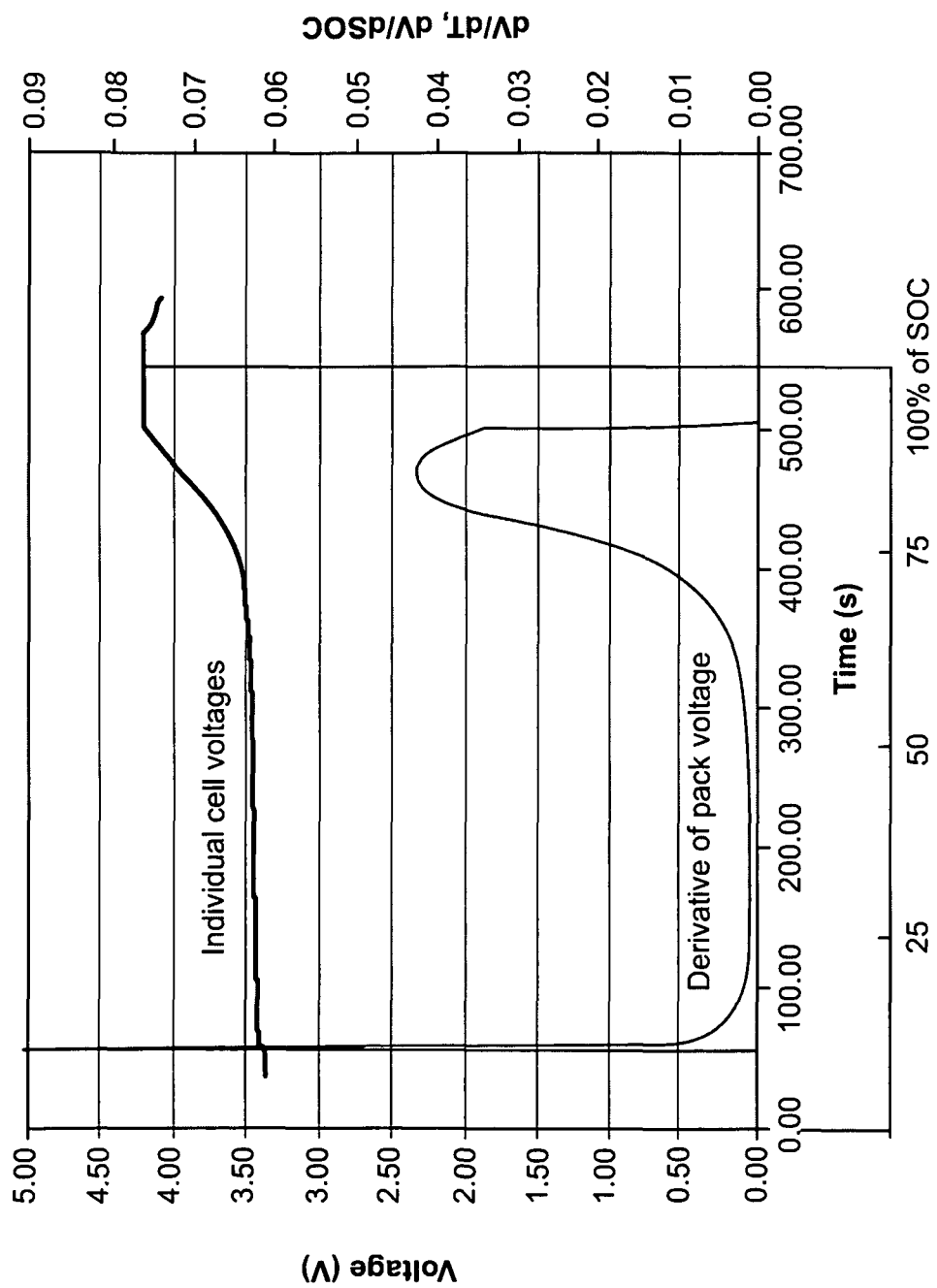
FIG. 1(b) is a graph demonstrating a balanced battery pack charged from ~85% SOC to full SOC, in accordance with an exemplary aspect of the invention.

FIG. 1(a) shows the charge voltage, V(t), of a well-balanced pack comprising a series string of five APR Nanophosphate cells (5s1p configuration), the voltage response of the 5 individual cells, and the derivative of the pack voltage dV/dt. The pack was charged at a constant current of 1.5 A after first charging each cell 4.2V, then each cell was discharged to 85% SOC before joining the cells in series. FIG. 1(b) shows the individual cell voltages on an expanded scale, where it is seen that the cells are very closely matched in their voltage-time response, and also that this particular battery chemistry exhibits a relatively constant voltage until full charge is approached. It is observed that battery pack voltage, the individual cell voltage and the voltage with respect to time all rise sharply upon reaching a state of full SOC. This rise in readings occurs as a result of more energy being required to move ions within the individual cells to its original fully charged state and can be used to determine a sufficient SOC. Although the figures represent SOC, it will be appreciated that the disclosed embodiments are likewise applicable to monitoring SOD. FIGS. 1(a) and 1(b) also show dv/dSOC with respect to percent of SOC.

Figure 2A:
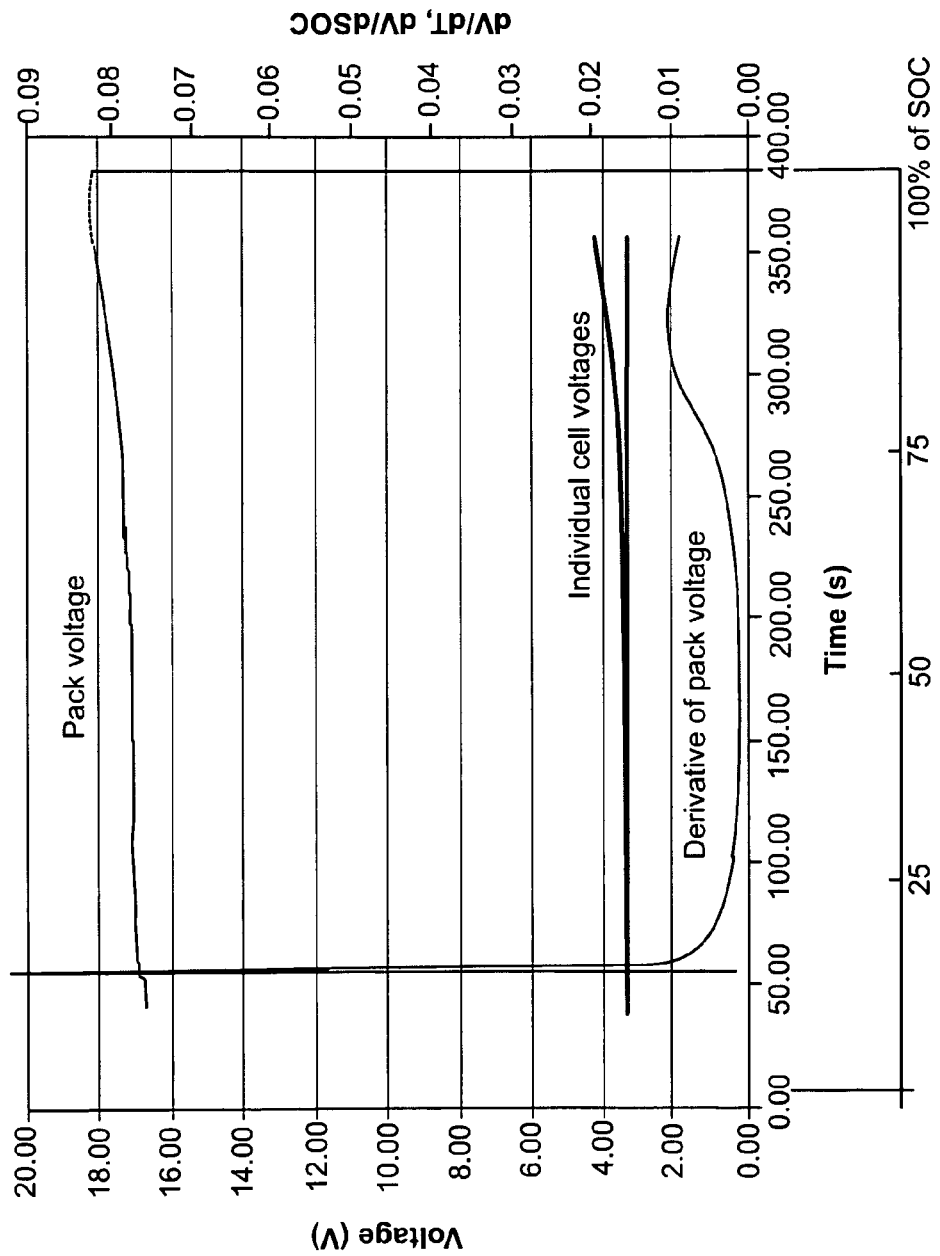
FIG. 2(a) is a graph demonstrating an unbalanced battery pack with one cell at 90% SOC, 1 cell at 85% SOC and 3 cells at 80% SOC, demonstrating the overall battery pack voltage and individual cell voltages, in accordance with an exemplary aspect of the invention.
Figure 2B:
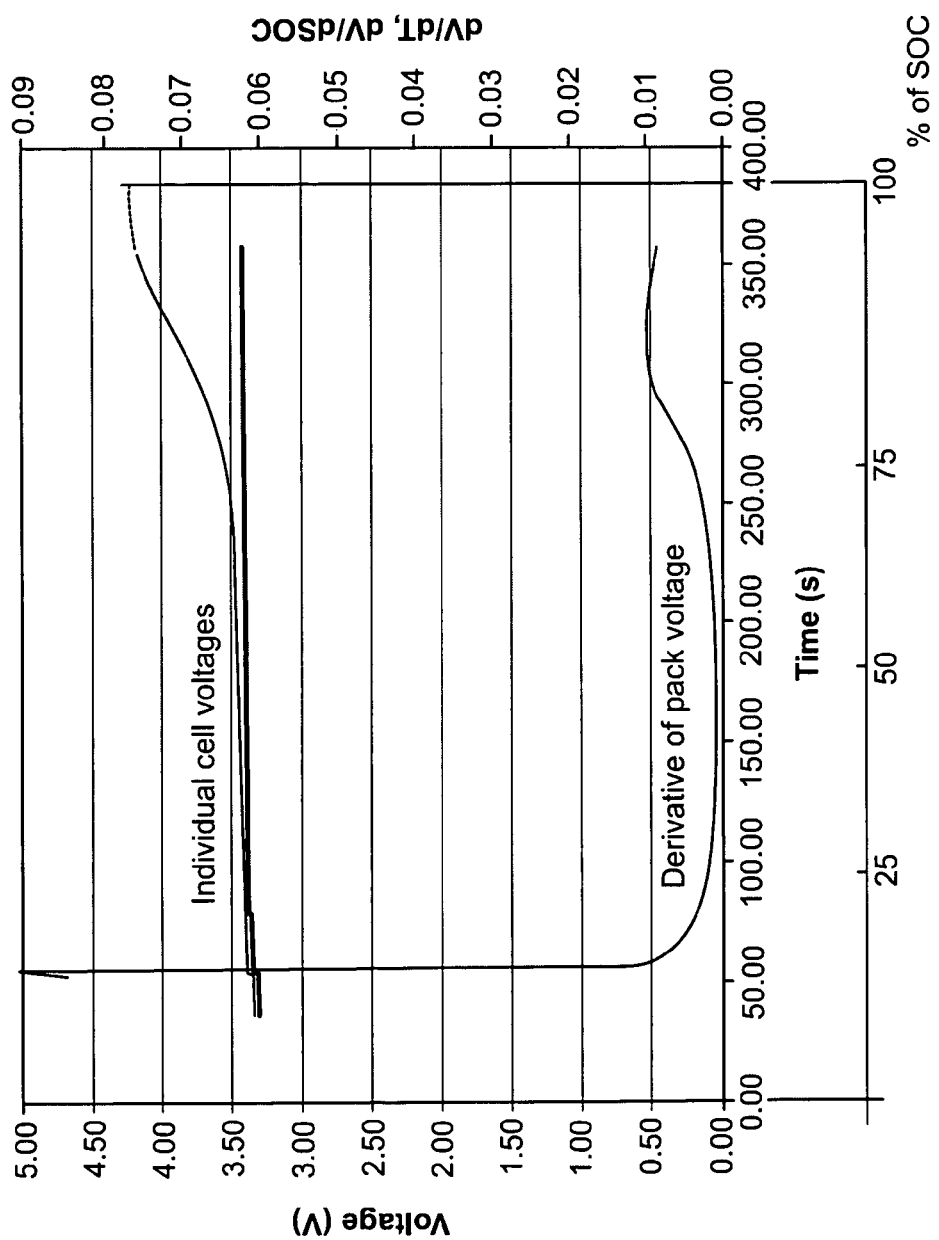
FIG. 2(b) is a graph demonstrating an unbalanced battery pack with one cell at 90% SOC, 1 cell at 85% SOC and 3 cells at 80% SOC, demonstrating the individual cell voltages, in accordance with an exemplary aspect of the invention.
Figure 3A:
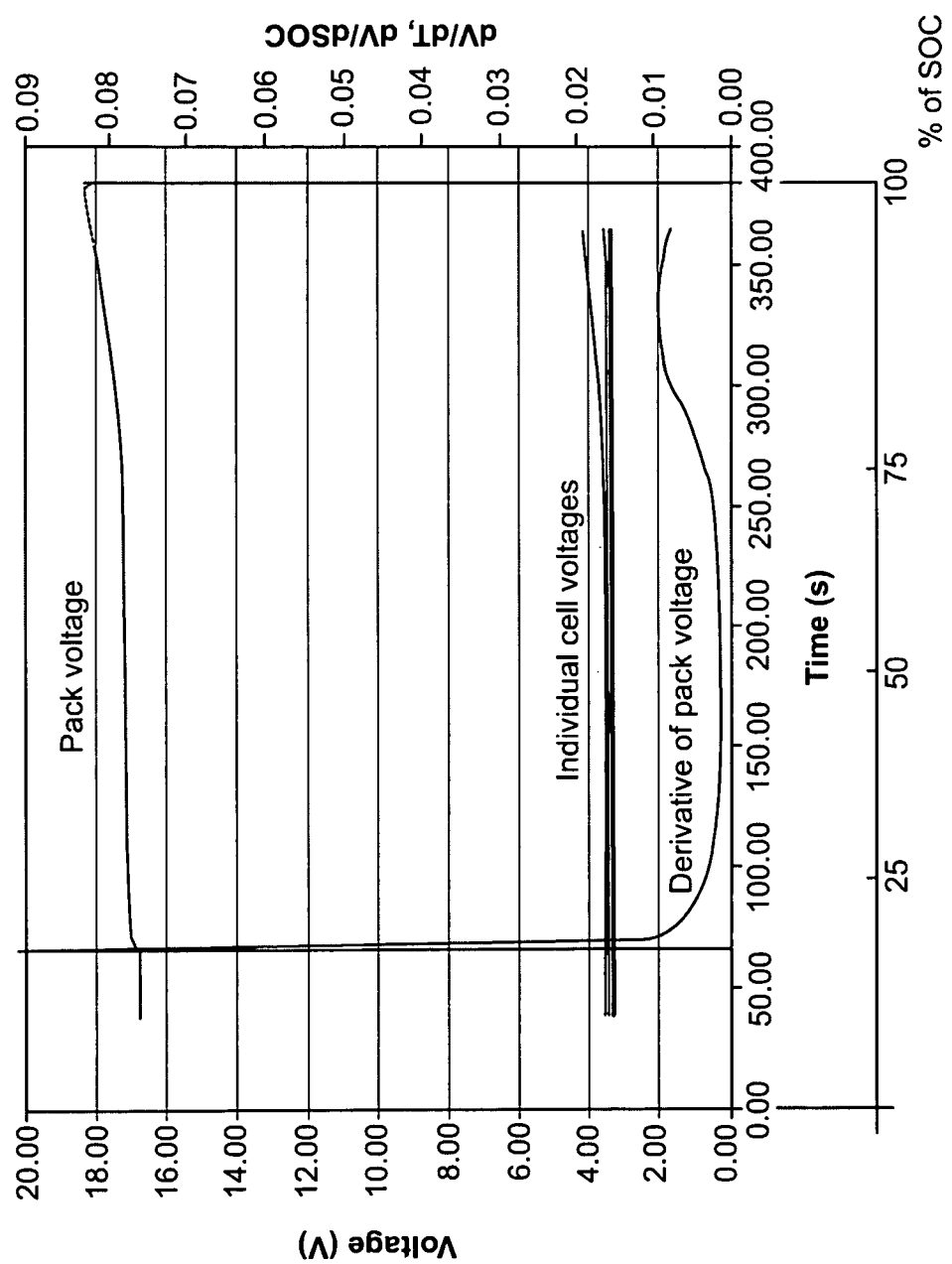
FIG. 3(a) is a graph demonstrating an unbalanced battery pack with one cell at 90% SOC, and 4 cells at 80% SOC, demonstrating the overall battery pack voltage and individual cell voltages, in accordance with an exemplary aspect of the invention.
Figure 3B:
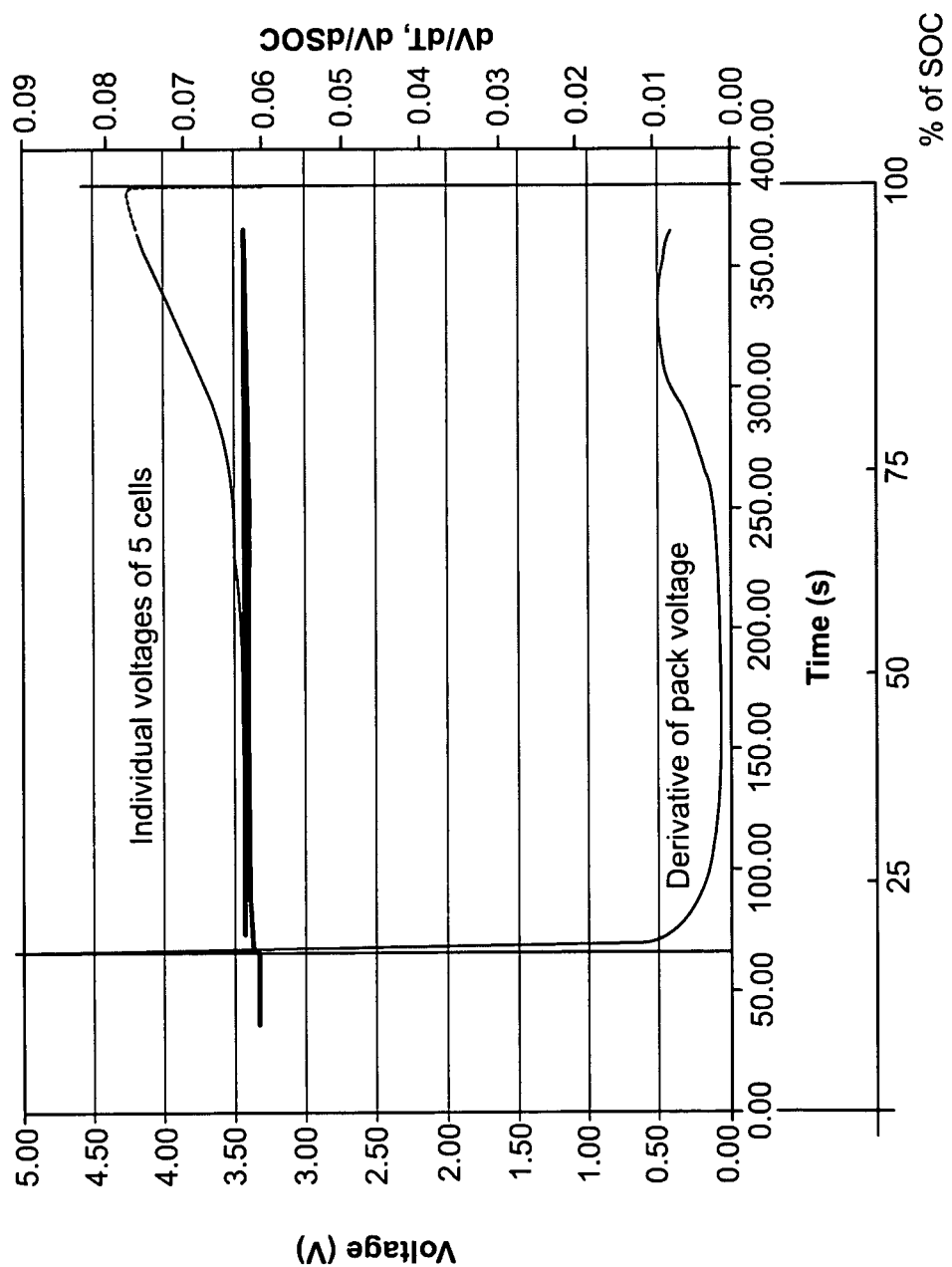
FIG. 3(b) is a graph demonstrating an unbalanced battery pack with one cell at 90% SOC, and 4 cells at 80% SOC, demonstrating the individual cell voltages, in accordance with an exemplary aspect of the invention.

In FIGS. 2(a) and 2(b), corresponding data are shown for an unbalanced pack in which one cell is at 90% SOC one cell at 85% SOC, and 3 cells are at 80% SOC. In FIGS. 3(a) and 3(b), corresponding data are shown for an unbalanced pack in which one cell is out of balance with respect to the other four, being at 90% SOC whereas the other four are at 80% SOC. FIGS. 2(a)-3(b) also show dv/dSOC with respect to percent of SOC. FIGS. 2(a)-3(b) represent a series string in which two of the cells are out of balance with respect to the other three, and will reach their full state of charge faster. This may be due to a drift in the SOC of the two cells relative to the other three. Drift or loss of capacity can occur naturally over the life of lithium ion cells. For example, lithium ion cells can lose ions due to the result of varying temperature conditions among the cells. FIGS. 1(a)-3(b) refer to individual voltages for illustration purposes. Exemplary embodiments of the invention do not calculate voltages separately for the individual cells, as noted below.

In accordance with an exemplary aspect of the present invention, the rate of change of pack voltage with respect to the state of charge, dV/dSOC, can be measured with high precision and accuracy, and can be used to determine when any one cell is approaching full SOC. Furthermore, a limiting value of the pack dV/dSOC can be used to determine when the battery pack is fully charged. For example, a 5s1p string of APR cells may be charged using a cutoff to end-of-charge of dV/dt greater than about 0.008 V/sec. Using this value of cutoff would both fully charge the pack, and prevent any of the cells from going into an overcharge situation if the cells are imbalanced. Similarly, a predetermined cut off would be provided when dv/dSOC is monitored.

In another exemplary aspect a dV/dSOC above a certain limiting value indicates that that at least one cell is reaching its charge limit. An exemplary detection method may include detecting when dV/dSOC is greater than a certain value x, indicating that at least one cell is reaching its charge limit. The certain value x may encompass a range of values that is sufficient to detect when the dV/dSOC caused by one cell has reached the threshold amount, while also encompassing a scenario where multiple cell simultaneously obtain an increased dV/dSOC. As an example, the dV/dSOC threshold may be based on a 90% or greater SOC. If more than one cell has a sufficient increase in dV/dSOC, the SOC of the battery back will spike more quickly. If only one cell has an increase in dV/dSOC, the SOC of the battery pack will spike, but not as drastically. An exemplary embodiment is provided with a threshold that detects an increase in dV/dSOC representative of even one cell reaching the threshold, so that charging is stopped, or discharging is stopped if the SOD is being detected. This will prevent the one cell from being overcharged or over discharged and damaged.

In order to more fully charge the pack, it is expected that more complex functions of V, dV/dt, and $d^2V/dt^2$ could be used to detect when to end charge. Also, while dV/dt is similar to dV/dSOC under constant current conditions, it is possible for the current to fluctuate under use conditions. dV/dSOC may be determined by measuring and integrating the current over time in order to determine the SOC and dV/dSOC accurately. For constant current, dv/dt is proportional to dv/dSOC. When the current varies, the dv/dt=di/dt*R+dv/dSOC. In one exemplary embodiment, dV/dt may be used when one knows that di/dt is zero. The relationship between dv/dSOC and dv/dt is dv/dt=i*dv/dSOC. At a high SOC, the dv/dSOC quickly changes in the positive direction and at a low SOC, dv/dSOC quickly changes in the negative direction.

According to an exemplary embodiment of the present invention, a battery charger product comprises a regulated switching power supply capable of accepting an input voltage from a power source such as an AC or DC source, and charging one or more battery cells, e.g., a series string of Nanophosphate cells. The power supply is controlled by a microprocessor which monitors the electrical and temperature conditions inside the charger (and/or the battery pack), detects fault conditions and displays the charger status and charge progress. The microprocessor monitors only the series voltage and current of the pack to determine when to terminate charge during the recharge period.

The charger is designed for easy operation with as little human intervention as possible, yet is versatile enough to charge an nS (Series) pack, where n is greater than 1, and for example is between 1 and 100, and may be between 1 and 20, or may be between 1 and 10. For example, many power tool packs utilize a 2 s, 5 s, 6 s, or 10 s string. The charger first senses the battery voltage on the main output terminals. It applies a small electrical load to the battery to: 1) reduce the top charge on the pack if necessary and 2) to determine the impedance of the battery. It then drives the pack to a slightly higher voltage holding the charge current at a steady rate. When it detects an end-of-charge condition, e.g., a sharp increase in the rate of dV/dt or dv/dSOC, it terminates the recharge cycle.

Indication lights may be lit during the charge process to indicate charging, charge complete and error modes. In addition, the charger monitors temperature and voltages and takes action to prevent damage to itself and the pack. The input may connect to a standard power outlet such as an AC utility socket. The battery may be connected to the output through the same connection that is used to discharge the pack (i.e. the device's custom designed power connection). In an exemplary aspect of the invention, a temperature sensor may also be used to monitor the approximate temperature of the cells in the pack.

Figure 4:
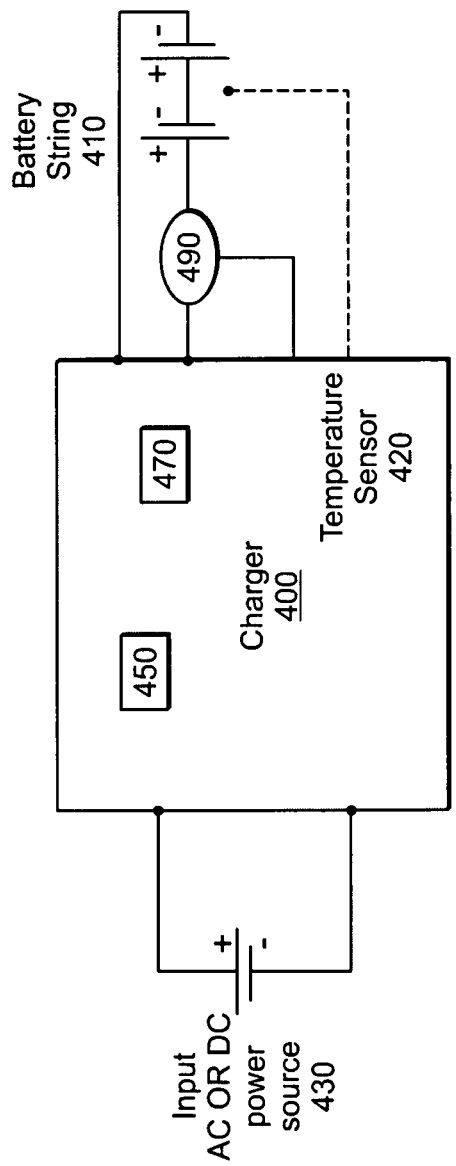
FIG. 4 is a schematic diagram demonstrating a battery pack and battery charger, in accordance with an exemplary aspect of the invention.

FIG. 4 shows charge connections of the battery and optional temperature sensing. The charger 400 is connected to either an AC or DC power source 430. This enables charger 400 to charge battery string 410 including multiple cells. The charger 400 may include a temperature sensor 420. Temperature sensor 420 has the ability to sense the temperature of string 410 or charger 400. The sensor 420 indicates to the charger 400 to terminate charging upon reaching a predetermined maximum temperature. Also included in the charger 400 is a microprocessor 450 that calculates the rate of change of voltage with respect to a state of charge (dV/dSOC) of the battery pack based on a measurement of the dV/dSOC that represents the battery pack as a whole, based on input from a sensor 470 that measures voltage, and from sensor 490 that provides a current reading. The measurements are representative of the entire battery pack and not of individual cells. For example, in an exemplary embodiment, hardware or other means is not provided for each individual cell to separately monitor dv/dSOC for each cell. Instead one dv/dSOC value is calculated that is representative of all cells in the battery string 410 as a whole. Sensor 490 converts the value of a current going into the battery into a signal which can read by the microprocessor 450. The sensor 490 can be, but is not limited to, a Hall-effect sensor or shunt resistor positioned to read the current entering the battery. This current value is used to determine the dv/dSOC calculation.

In an exemplary embodiment, a battery manager including a microprocessor is responsible calculating the dv/dSOC. The battery manager instructions a supplemental device to stop charging or discharging the battery pack when the predetermined dv/dSOC is reached.

In an exemplary embodiment, each millisecond the charger's microprocessor 450 samples the charger's output voltage and current. The temperature in the charger and the pack may also be sample, for example, every 200 milliseconds. The charger will normally output charge voltages of that which is slightly above the measured pack voltage, but high enough to drive the pack current to a fixed predetermined rate (such as 1C). However, if it senses that one of the cells in the string is at or above a predetermine SOC threshold range, 100% SOC, or other predetermined criteria, it will cease supplying voltage and current to the pack.

Figure 5:
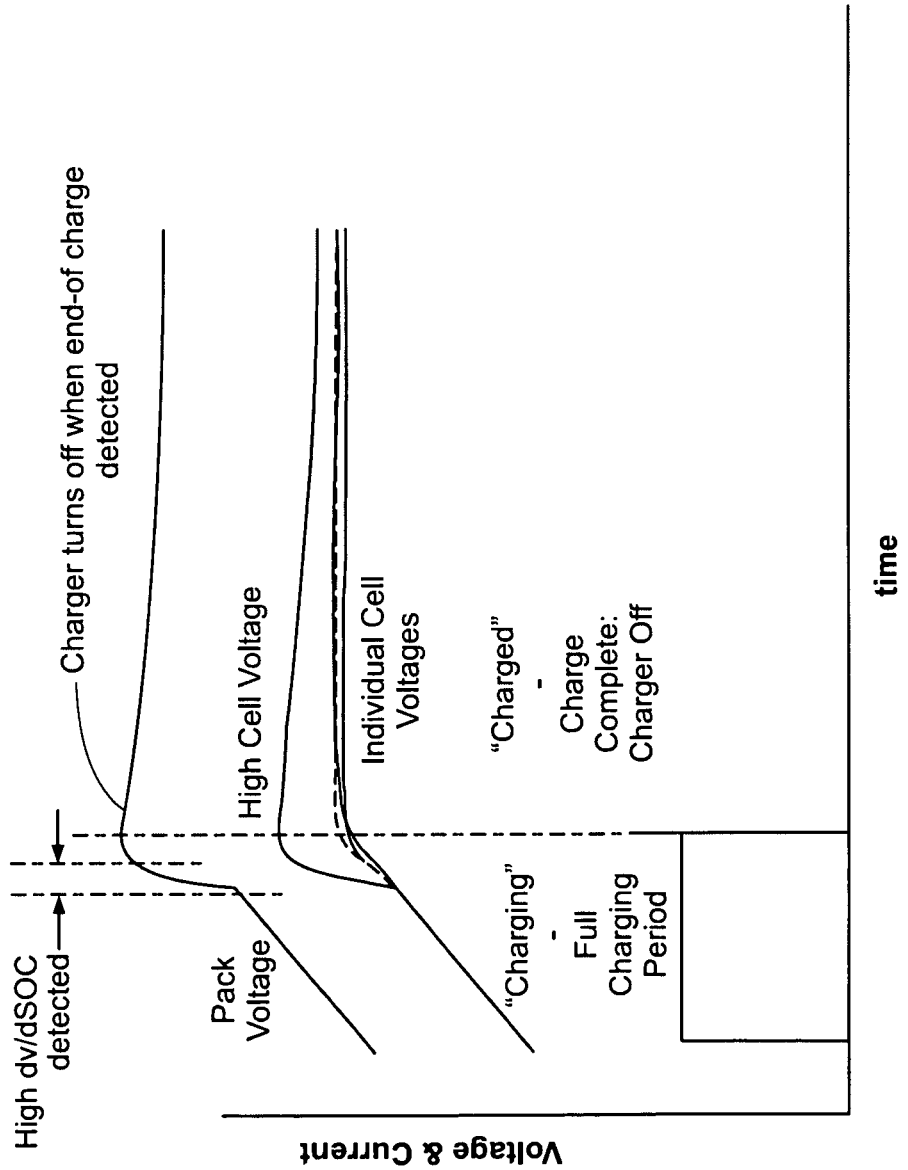
FIG. 5 is a graph demonstrating charging voltage and current with respect to time of a battery pack and individual included cells, in accordance with an exemplary aspect of the invention.

Since the dV/dSOC of any single series cell in the pack rises near the end of a charge cycle, the dV/dSOC of the whole pack will also rise. Therefore the end of charge condition can be detected by measuring the dV/dSOC of the series pack voltage and individually and separately measuring dv/dSOC for each cell is not required. Referring to FIG. 5, the rate of dV/dSOC rises sharply as a single cell approaches its maximum SOC.

The rate of dV/dt can be measured by taking voltage samples at fixed time intervals and conducting subtraction and division operations. Sample a first voltage, v1 at an initial time, t1, and a second voltage, v2 at a second time, t2. Dv/dt will equal (v2−v1)/(t2−t1). To calculate dV/dSOC, sample a first voltage, v1 and first current, i1, at an initial time, t1, and a second voltage, v2 and second current i2, at a second time, t2 Dv/dSOC will equal dv/dt divided by (i1+i2)/2. Voltage samples can be taken by the microprocessor 450 coupled with an internal (to itself) or external analog to digital converter circuit. The microprocessor 450 calculates the dV/dSOC on the digital numerical representations of the voltage being sampled. When the rate of dV/dSOC is calculated to be higher than a predetermined threshold, the microprocessor can terminate the charging action. In accordance with another exemplary aspect this can also be performed by analog circuitry using a combination of capacitors or inductors, resistors and analog conditioning circuitry to perform the differentiation. The analog circuitry outputs a signal which is proportional to the dv/dSOC of the pack voltage. This signal is compared to a fixed reference voltage and triggers the end of charge condition when it exceeds that reference voltage. The charger microprocessor illuminates the "charging" and "charged" lights based on whether it is providing charge to the battery or not.

In an exemplary embodiment, the charger monitors a point inside near its hottest power components five times every second. When this temperature exceeds a preset limit the charger ceases output current until the temperature falls below the limit. The charger monitors the input voltage and will shut off the charge current if the input voltage is out of range. The charger monitors the dv/dSOC for the end-of-charge inflection points, and will terminate the charging if the condition is detected. However, if for some reason, the output voltage rises out of control above a safe operating point (Max rated battery voltage), the charger shuts down the output current.

In an alternative embodiment, the charger optionally measures the temperature inside the battery pack using a thermistor or similar device, to detect a high temperature inside the pack. This high temperature condition will cause the charger to shut down its charger current as well.

The previous description of the exemplary embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein, but is to be accorded the widest scope as defined by the limitations of the claims and equivalents thereof.

What is claimed is:

1. A system for charging a battery comprising:
    a battery pack having at least two lithium ion cells;
    a controller that detects a rate of change of voltage with respect to a state of charge (dV/dSOC) of the battery pack based on a calculated dV/dSOC that represents the battery pack as a whole, without calculating dV/dSOC individually on a cell-by-cell basis;
    wherein charging is terminated when dV/dSOC reaches a predetermined value.

2. The system of claim 1, wherein the battery pack consists of at least two lithium ion cells connected in series.

3. The system of claim 1, wherein the battery pack may be one from the group comprising a n series (nS), wherein n is at least two and no more than ten.

4. The system of claim 1, wherein the controller comprises a microprocessor that terminates the charging.

5. The system of claim 1, wherein the controller comprises analog circuitry.

6. The system of claim 4, wherein the microprocessor is a battery manager.

7. The system of claim 1, wherein the dV/dSOC is indicative of at least one cell reaching the predetermined value before another of the cells.

8. The system of claim 1, wherein the controller is configured to detect temperature of the internal components of the battery pack and will terminate charging if the temperature exceeds a predetermined threshold value.

9. The system of claim 8, wherein the temperature is detected by a thermistor.

10. The system of claim 1, wherein the at least two lithium ion cells comprises $LiFe_{1-y}Mn_yPO_4$, wherein y represents various concentrations of Mn.

11. A battery charger, comprising:
    a battery pack comprising lithium ion cells;
    a circuit which determines a rate of change of voltage of the battery pack with respect to a state of charge (dV/dSOC) of the battery pack based on a calculation of the dV/dSOC that represents the battery pack as a whole, without individually calculating dV/dSOC on a cell by cell basis; and
    wherein charging of the battery pack is terminated when a predetermined dV/dSOC has been reached.

12. The battery charger of claim 11, wherein the charger comprises a regulated switching power supply capable of accepting an input voltage from an AC or DC power source.

13. The battery charger of claim 12, wherein the power supply is controlled by a microprocessor.

14. The battery charger of claim 13, wherein the microprocessor terminates charging based on readings of the voltage and current of the battery pack.

15. The battery charger of claim 11, further comprising temperature sensing circuitry to monitor the temperature of at least one of the battery pack and the charger.

16. The battery charger of claim 13, wherein the voltage sensing circuitry comprises at least one of digital or analog converter circuitry.

17. The battery charger of claim 13, wherein the microprocessor is coupled to voltage sensing circuitry to determine a series voltage of the battery back as a whole.

18. The battery charger of claim 17, wherein charging of the battery pack is terminated by the microprocessor upon a condition of dV/dSOC of at least one lithium ion cell exceeding a predetermined rate.

19. The battery charger of claim 17, further comprising temperature sensing circuitry to terminate charging of the battery pack upon determination that the temperature of the battery pack has exceeded a predetermined value.

20. A method of charging a battery pack, comprising:
    providing a battery pack of at least two or more lithium ion battery cells;
    detecting the rate of change of voltage with respect to the state of charge (dV/dSOC) based on a calculated dV/dSOC that represents the battery pack as a whole, without individually detecting dV/dSOC on a cell by cell basis;
    comparing the detected dV/dSOC with a predetermined dV/dSOC associated with the battery pack; and
    terminating the charging of the battery pack based on the comparison.

21. The method of claim 20, wherein the terminating of the charging of the battery pack occurs if the detected dV/dSOC is equal to or exceeds the predetermined dV/dSOC.

22. The method of claim 20, further comprising detecting the temperature of the battery pack.

23. The method of claim 22, wherein charging is terminated based on the temperature reading.

* * * * *